United States Patent [19]

Stricker

[11] Patent Number: 5,013,882
[45] Date of Patent: May 7, 1991

[54] LABYRINTH FILTER FOR DIELECTRIC OF SPARK EROSION SYSTEMS

[75] Inventor: Max Stricker, Tobel, Switzerland

[73] Assignee: A.G. für industrielle Elektronik, Losone, Switzerland

[21] Appl. No.: 214,326

[22] Filed: Jun. 29, 1988

[30] Foreign Application Priority Data

Jun. 29, 1987 [CH] Switzerland .................. 2434/87
Oct. 15, 1987 [EP] European Pat. Off. ........ 87810593.1

[51] Int. Cl.$^5$ .................. B23H 1/10; B01D 24/12
[52] U.S. Cl. .................. 219/69.14; 137/884; 210/253; 210/275; 210/278
[58] Field of Search .............. 210/275, 277, 278, 287, 210/253, 258, 175, 176; 137/884; 219/69.14

[56] References Cited

U.S. PATENT DOCUMENTS

| | | | |
|---|---|---|---|
| 3,435,175 | 3/1969 | Shaffer | 219/69.14 |
| 3,469,057 | 9/1969 | Maines | 219/69.14 |
| 3,523,547 | 8/1970 | Hatch, Jr. et al. | 137/884 |
| 3,578,167 | 5/1971 | Clack | 210/253 |
| 3,765,441 | 10/1973 | Chang | 137/884 |
| 4,102,786 | 7/1978 | Okada et al. | 210/275 |
| 4,454,033 | 6/1984 | Verduyn | 210/277 |
| 4,750,999 | 6/1988 | Roberts et al. | 210/275 |

FOREIGN PATENT DOCUMENTS

| | | | |
|---|---|---|---|
| 2425192 | 5/1975 | Fed. Rep. of Germany | 210/275 |
| 1295907 | 11/1972 | United Kingdom | 137/884 |

*Primary Examiner*—Geoffrey S. Evans
*Attorney, Agent, or Firm*—Malin, Haley, McHale, DiMaggio & Crosby

[57] ABSTRACT

In order to filter out of the dielectric the microscopically small spherical particles removed by spark erosion [???] machines, a labyrinth filter is provided, containing at least one filter unit with a pressure receptacle (21) loosely filled with filter grains. The intake surface area is relatively small by comparison to the height of the column through which the liquid to be filtered flows, and the filter pump is matched to these two dimensions in such a way as to cause the dielectric to flow through the labyrinth at a rate of at least 2 meters per minute. This leads to the formation of low-pressure zones behind the individual filter grains, in which zones the microscopically small spherical particles removed by the erosion [???] process become trapped.

11 Claims, 5 Drawing Sheets

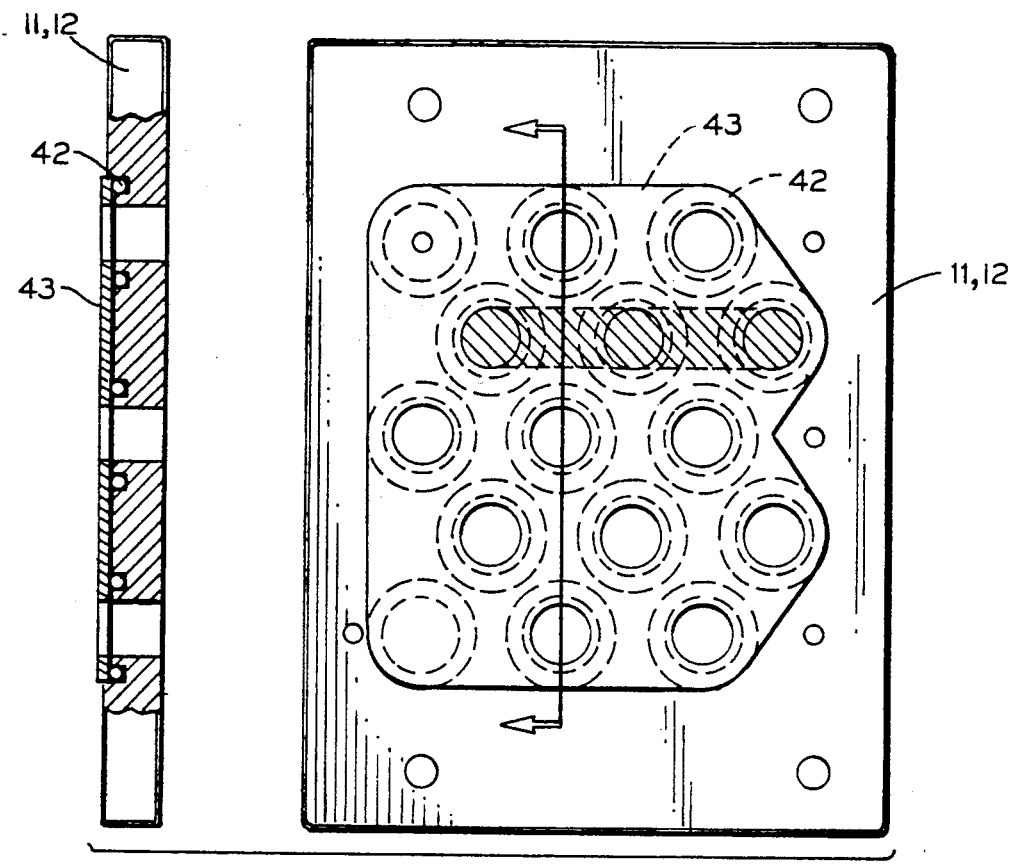
FIG. 5
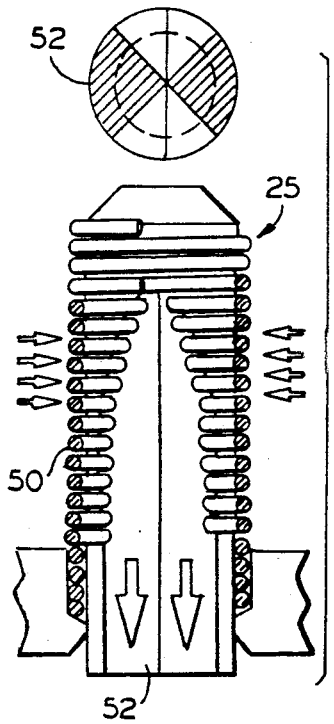
FIG. 8
FIG. 9
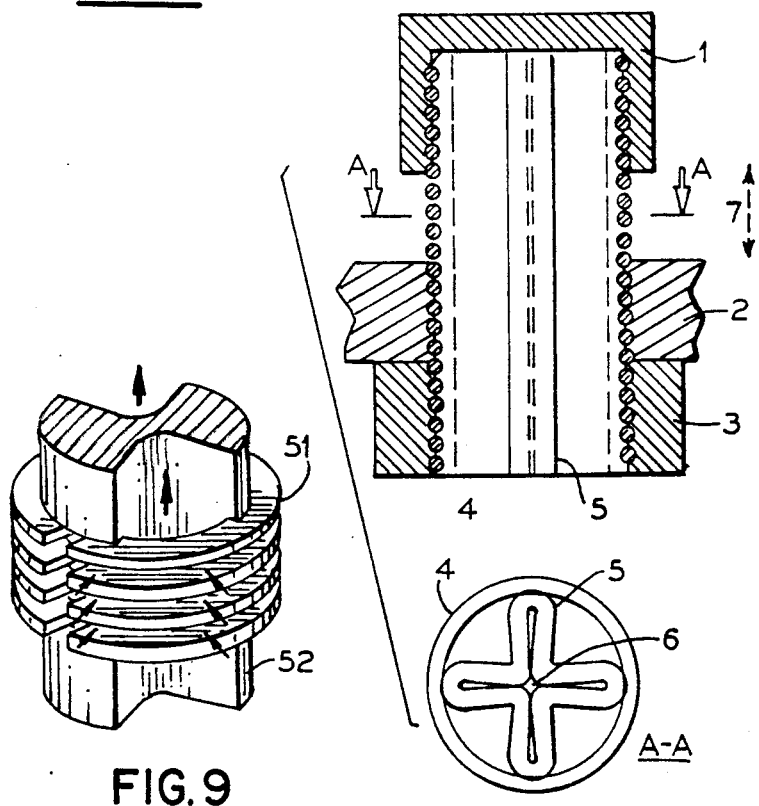
FIG. 10

LABYRINTH FILTER FOR DIELECTRIC OF SPARK EROSION SYSTEMS

The invention concerns a labyrinth filter for the spherical metal particles in the dielectric of spark erosion systems, as well as a filtration system with at least one such labyrinth filter.

As is well known, the dielectric of spark erosion systems must be continuously cleared of contamination in the form of spherical metal particles ranging in size from 1 to 20, which are removed during the process of spark erosion. Known filters are constructed on the principle of forced filtration, whereby the particles are trapped in and in front of openings having a diameter smaller than that of the particles. In this way, a layer of metal particles forms rather rapidly, eventually clogging the filter. Previously known filters of this kind, such as diatomaceous earth filters or cartridges with mesh-type filters, therefore have a relatively short service cycle, and must be periodically changed or serviced. The periodic changing or regeneration of the filter results in large accumulations of non-reusable waste product, is cost-intensive and requires periodic manual intervention to change the filter, thus precluding fully automatic, unsupervised operation over prolonged periods, such as weekends.

There is thus a need to devise a filter for the small spherical metal particles from erosion equipment, which filter will have a longer service cycle and be easy to clean and reusable, as well as making possible fully automatic operation for prolonged periods without manual intervention.

Surprisingly, it has been shown that this need can be met by means of a labyrinth filter constructed in accordance with the invention described and claimed herein.

Unlike the aforementioned forced filtration, the labyrinth filter works on the basis of the effect whereby the microscopically small spherical metal particles are trapped in inherently larger interstices in "quiet" or low-pressure zones formed in accordance with flow conditions.

Unlike conventional filters in which a fine mesh removes the particles from the flow of liquid and thereby effects a form of forced filtration, the large number of "quiet" zones existing in a random distribution in every labyrinth through which a steady rate of flow is maintained are used to achieve random depositing of the metal particles.

Such a labyrinth can be effectively constructed using economical granular or spheroid materials which do not bind in any way to the metal particles. The surface of the grain should preferably be as smooth as possible, in order to offer as little resistance as possible to the liquid flowing through the filter. The grains should be of non-uniform size and shape, in order to create the largest possible number of local differences in pressure and rate of flow on the half of the grain surface facing the outlet side.

For the reasons stated, the labyrinth filter's action on the spherical metal particles takes place only above a certain rate of dielectric flow through the filter, and this filtering action mainly results not from the accumulation of a layer of metal particles trapped by a mesh, as is the case with forced filtration, but from the occupation of the aforementioned "quiet zones" by metal particles throughout the entire height of the filter. In this way, the entire height of the labyrinth filter is used. Regeneration requires only a minimal reverse flow. Once the grains comprising the labyrinth are displaced even slightly, the deposited particles are immediately released. Thus the labyrinth can be backwashed either with pulses or with large changes in pressure, in order to avoid causing a filtration effect in the reverse direction.

As has already been mentioned, the particles removed in spark erosion processes are not amenable to sedimentation processes immediately upon formation. They remain in suspension for extremely long periods, making the duration of the sedimentation process too long for practical applications.

Surprisingly, however, it has been shown that in the labyrinth filter, metal particles form conglomerates which can be removed from the flushing liquid by sedimentation within a useful interval. The adequately pure liquid on top of the deposited layer of dirt can therefore be returned to the reverse-flow tank prior to the next backwashing operation. Thus it now becomes possible to have a closed circulation of liquid for the regeneration process.

In order to enable the aforementioned backwashing and filtering operations to proceed automatically, it would be necessary to have a multiplicity of controllable valves, which would not only present a risk of malfunction threatening operational reliability, but would also imply a complicated, costly equipment design. In particular, there is a danger that in time, valves would be clogged by the metal particles in the dielectric, in particular when such particles accumulated on magnetized valve parts. For this reason, it is preferable to use a main valve having a plate assembly of perforated plates, one of which plates is designated as a control plate and movable among at least three positions, described in greater detail herein. With this design three main valve positions allow all necessary connections to be positively established.

An embodiment of the invention is described in greater detail below. On the accompanying diagrams:

FIG. 5 shows an overview and cross-sectional diagram of a second embodiment of a main valve seal plate;

FIG. 8 shows a view of a retainer element;

FIG. 9 shows a second embodiment of a retainer element;

FIG. 10 shows a third embodiment of a retainer element.

FIG. 1 depicts first of all a filtration column of the labyrinth filter, with cooling system added.

As already mentioned, the basic assumption is that entering metal particles are for the most part not held back by the intake surface (30), but rather that because of the spherical shape of the metal particles, the "quiet zones" established behind the filter grains as a function of flow conditions enable the filter to trap the metal particles. For this reason, the height of the column (31) which must be traversed by the flow is relatively great by comparison to the intake surface area. Inasmuch as the resistance offered to the flow through the filter is relatively slight by comparison to other types of filters, the limit on available height is determined primarily by overall structure height.

Figure 6:
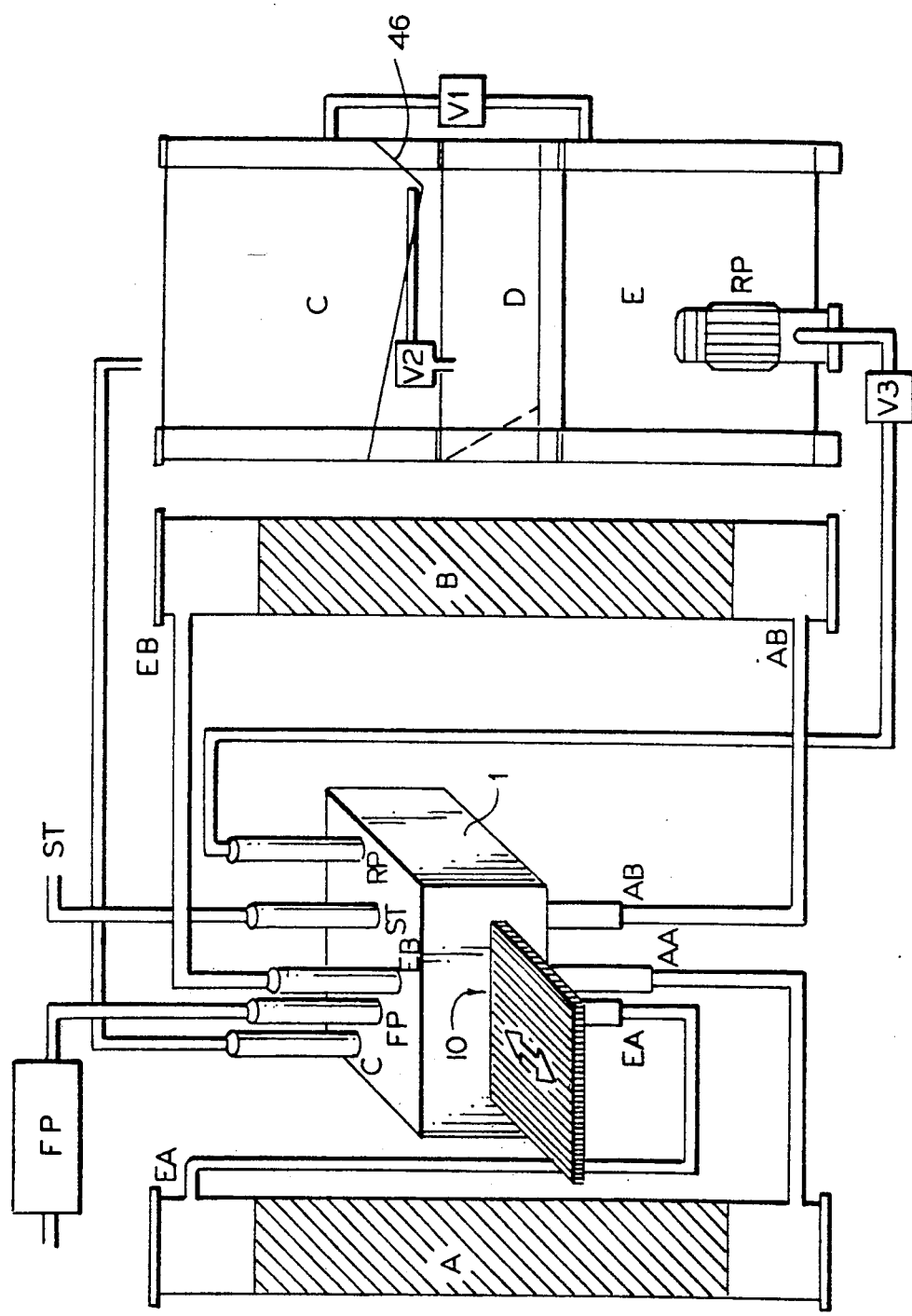
FIG. 6 shows a schematic view of piping connections for the system.

As may be seen in particular in FIG. 6, the necessary structure height can be reduced by connecting two filter units (A and B) in series. Each of these units is constructed essentially in accordance with FIG. 1. A single cooling system such as that shown in FIG. 1 can provide for the two units A and B. In this figure, only one of the units (A) is visible; the other must be imagined to be hidden behind the unit shown.

Each of the filter units possesses a pressure receptacle (21), which is loosely filled with filter grains (K).

The pressure receptacles are not filled completely. The space remaining at the top serves the purpose of allowing the volume of the filling to expand during backwashing, so that each of the filter grains may be released from contact with the others and move freely in the backwashing liquid.

To the basic pressure receptacle unit are attached by means of threaded flanges an upper collection chamber (22) and a lower collection chamber (23), to which are in turn attached the intake connector (EA) and the outlet connector (AA). The dielectric to be filtered is introduced through intake connector EA at the top, which is supplied from the spark erosion chamber by means of a filter pump (FP) (cf. FIGS. 2, 6). The filter pump capacity, intake surface area and effective height of the labyrinth filter flow column are matched to one another such that the rate of flow of the dielectric through the filter will exceed a minimum of approximately 2 (preferably 3) meters per minute. At rates of flow below 2 meters per minute, the low-pressure zones or "quiet zones" in which the metal particles are trapped are no longer present in the desired abundance, and the filtering action is no longer ensured.

In the present embodiment, the tube diameter is 211 mm, corresponding to an intake surface area of 3.5 dm$^2$. The labyrinth height is approximately 1,400 mm for each of the filter units, or a total of approximately 2,800 mm. The quartz sand filter grains have a grain size of between 0.3 and 0.7 mm. The free-flow cross-section is approximately 7% of the aforementioned intake surface area. In operation, a volume of 26 to 32 liters per minute is supplied from the filter pump. The rate of flow through the labyrinth at an average volume of 28 liters per minute is thus approximately 11 meters per minute during normal operation. This is substantially higher than in conventional sand filters.

These values enable the dielectric to flow through the labyrinth at a rate sufficient to cause the side of the filter grains facing away from the intake to form flow-dependent low-pressure zones in which the microscopic metal particles collect.

Figure 1:
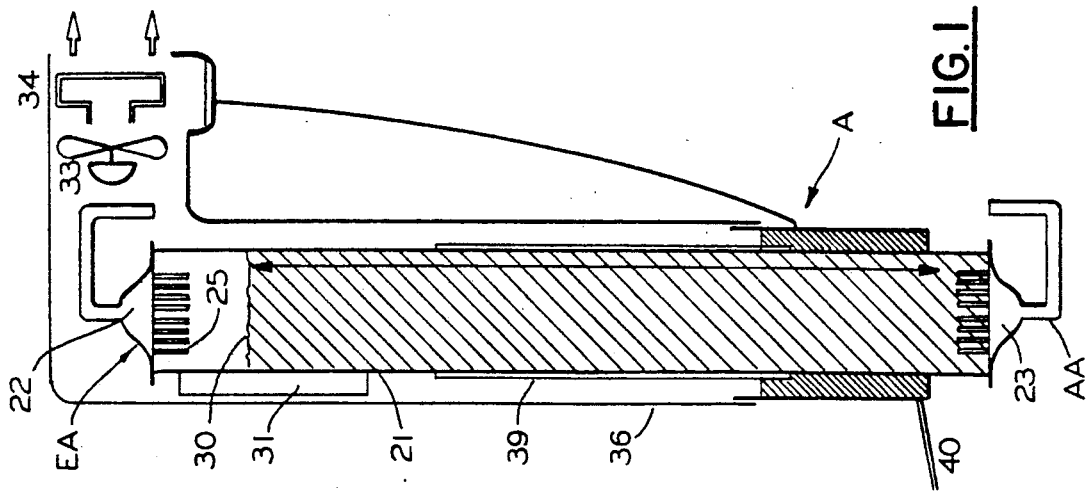
FIG. 1 shows a schematic cross-sectional diagram of a labyrinth filter.

The heat generated during the spark erosion process and the heating of the dielectric caused by pumping require that provision be made for cooling the dielectric. This can be advantageously combined with the filtration process, as shown in FIG. 1. Cooling is provided by means of a fan (33) and a cooling water jacket (38), open at the top, which encircles the lower third of the filter unit, being supplemented by fiber "fleece" (39), which surrounds the pressure receptacle of each filter unit to the maximum possible height and thus distributes water over the largest possible surface area for evaporation, and by cooling vanes (31), which are mounted on the upper third of the outside of the pressure receptacle. The humidification of the air caused by the spark erosion and cooling processes makes advisable the addition of an air dehumidifying system (34), which can likewise be incorporated into the filter system. This reduces undesirable humidity in the air, and returns the water to the circulation system via a pipe (40). This pipe (40) connects with the spark erosion system dielectric tank. Dehumidification of the air is accomplished by condensation on a cooled structure (34) mounted in the airstream of the fan (33). A further design feature of the filter are the retainer elements (25) (FIG. 8), which are also installed in the intake chamber, and which prevent the filter grains (K) from being flushed away during backwashing. The retainer elements consist of coil springs (50) which are threaded onto a core (52) provided with outlet channels. The distance between adjacent coils of the spring is kept smaller than the size of the grains. FIG. 9 shows a second possible embodiment of a retainer element (25) with individual spring elements (51) held in place on the core by spring tension. FIG. 10 shows a third embodiment of a retainer element. A tube (5) is provided with a thread which has a profile matching that of the spring (4) which is later to be wound up around it.

After threading, the tube is stamped into an X-shape, in order to form the cavities which exist inside the spring and allow a channel of escape for the liquid flowing from the outside to the inside of the retainer element.

A cap (1) with a thread likewise matching the spring holds the spring in place and prevents the flow of liquid through the opening in the center of the tube (6).

Several of these retainer elements can be placed in a mounting plate (2) with threaded holes, and secured by means of a locknut (3).

The cross section of the spring can be circular. In order to provide a longer calibrated channel of flow for the liquid, the cross section of the spring can also be square or of any other desired shape.

(7) is the usable length of the retainer element, which can be adjusted to meet specific needs.

In order to avoid the need for interrupting the operation of the system for periodic cleaning of the filter by backwashing, each of the two filter units (A and B) can be backwashed separately, while the unit not being backwashed maintains filter operation. During normal filter operation, filter units A and B operate in series. FIG. 6 shows in greater detail the switching of the filter units into tandem configuration by means of a main valve (1).

In its first operating position, the main valve (1) causes the dielectric to flow first through filter unit A and then through the second filter unit B, connected in series with the first; flow is from top to bottom in both cases. The clean dielectric emanating from the outlet connection (AB) on the second unit is then routed to a clean tank, where it is continuously fed back to the processing machinery. This creates a closed circulation of dielectric, which in the present system is not interrupted even during cleaning of the filter units. Periodic cleaning of the filter units is accomplished by backwashing the units one at a time, while the other unit maintains circulation. Backwashing likewise uses dielectric, which is supplied to the filter unit in question from a backwash tank (E) by means of a backwash pump (RP) which is switched on and off periodically, and which flows in pulses—that is, with extreme changes in pressure—from the bottom of the filter unit to the top. This causes the grains comprising the filter labyrinth to move about freely in the liquid used for backwashing, and eliminate the aforementioned "quiet zones" holding the metal particles, thus allowing these to be flushed away with the backwashing liquid.

The backwashing liquid laden with sediment from the filter is routed to a sedimentation tank (C), on whose bottom (46) the metal particles are deposited, as will be explained below in further detail. The backwashing liquid on top of this sediment is then routed back to the backwash tank (E) via a valve (V1), while the sediment consisting of metal particles is transferred via a valve (V2) to a drying tank (D). The main valve (1) provides all connections to filter units A and B required for purposes of these functions, as may be seen in FIG. 6.

Figures 7A, 7B, 7C:
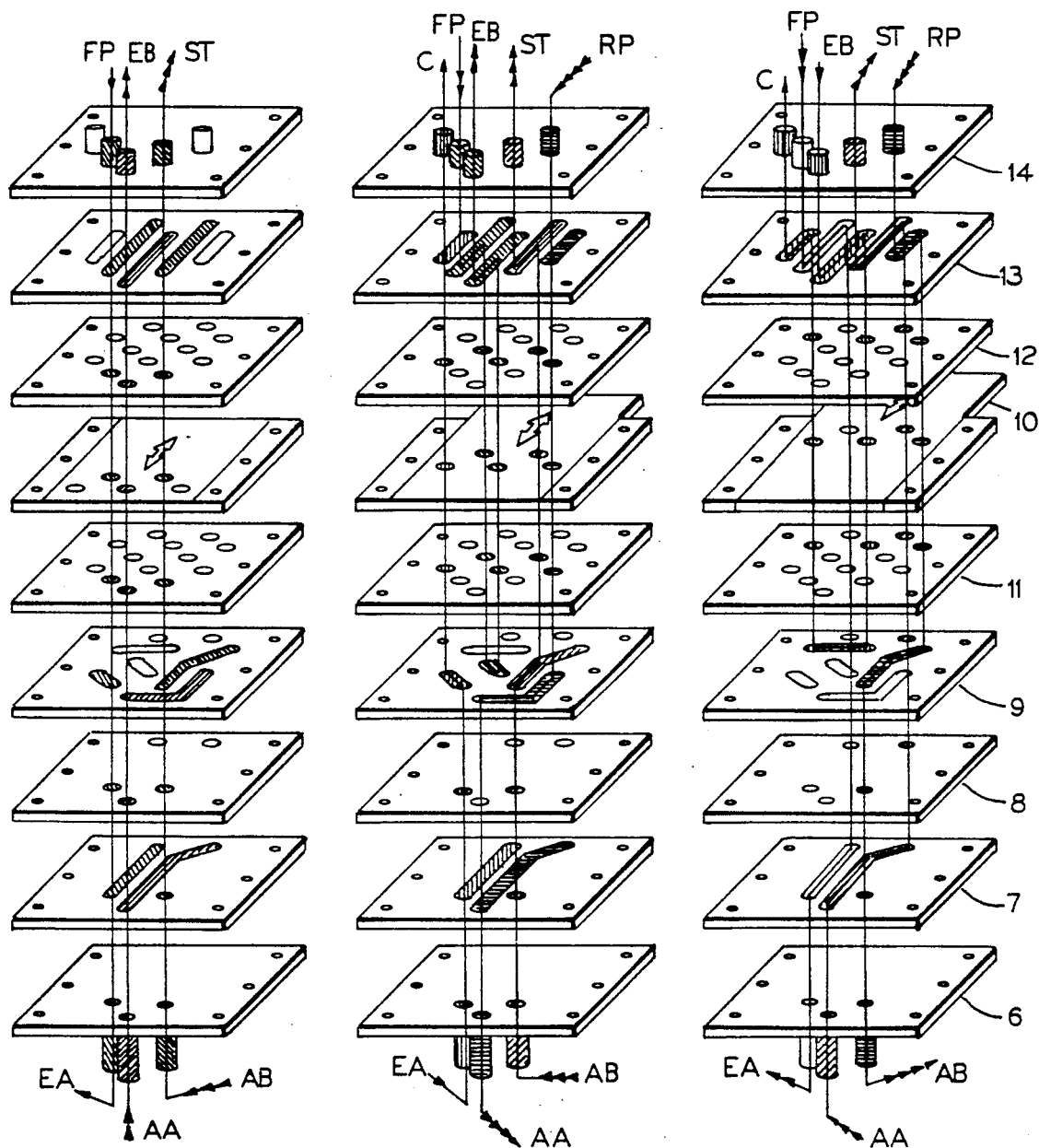
FIG. 7 shows an exploded view of the individual valve plates of the main valve in the latter's three different operating position.

As FIG. 7 shows, the main valve (1) consists of an assembly made up of a number of perforated plates (6 through 14). One of these is designed as a control plate (10), which may be shifted into any of three positions, each corresponding to one of the three operating configurations mentioned above. These three positions are depicted side by side in FIG. 7. The plate assembly consists, from top to bottom, of the following: First, a connector plate (14) holding the five connectors (C, FP, EB, ST and RP). Beneath this is the first of several connection channel plates (13), followed by a seal plate (12) with a grid of perforations. A corresponding seal plate (11) is positioned on the opposite side of the control unit (10). The second seal plate (11) is followed by a second connection channel plate (9), a blocking plate (8), a third connection channel plate (7) and the lower connector plate (6), with three connectors (EA, AA and AB). Each of the connection channel plates is surrounded throughout by plates with perforations forming channels with the same diameter as the lines connected to the valve assembly.

The left-hand portion of FIG. 7 shows the working position, in which the two filter units (A and B) operate in series. As may be noted, in this position dielectric flows through the valve in a straight line. Dielectric from the filter pump enters the valve through connector FP and exits through connector EA, which is connected to the intake of filter unit A. The dielectric then flows through this filter unit, whose outlet is connected to connector AA on the valve assembly. From AA, the dielectric proceeds to connector EB and from there is routed to the intake of the second filter unit (B). From the outlet of this unit, the dielectric flows via valve connectors AB and ST to the clean tank. The middle and right-hand portions of FIG. 7 show the two backwash positions, the former showing backwashing of filter unit A and the latter that of filter unit B, as will be immediately apparent from comparison of these diagrams with FIG. 6, no further explanation being therefore needed here.

Figure 4:
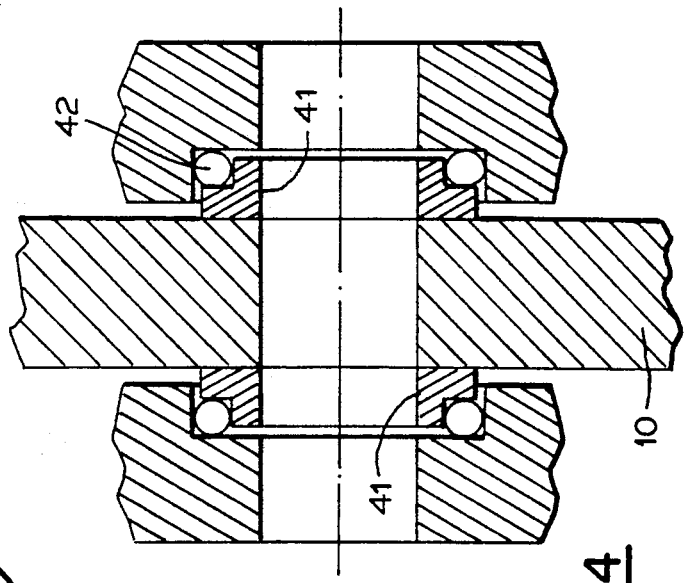
FIG. 4 shows a cross-sectional diagram of the control plate and seal plates of the main valve in one embodiment.

In the operating position, provision has been made to ensure that the connection channels are sealed off from one another. As FIG. 4 shows, seal plates 11 and 12, which must provide a means of sealing off each channel despite adjustability from one position to another, each perforation on the side facing the control plate (10) is surrounded by a sealing ring (41) which works together with the juxtaposed perforation in the control plate (10) or with the unperforated surface of the control plate (10). The sealing rings (41) are made of plastic, and compensate for minor irregularities on the surface of the control plate (10). Elastic rings (42) press the sealing rings against the seal plates.

FIG. 5 shows a variation on the seal plate design. Instead of individual sealing rings, the seal plates (11,12) have a single common sealing gasket (43) for all of the perforations, which gasket is likewise pressed against the control plate (10) by means of elastic rings (42) and provides a sliding seal.

Figure 3:
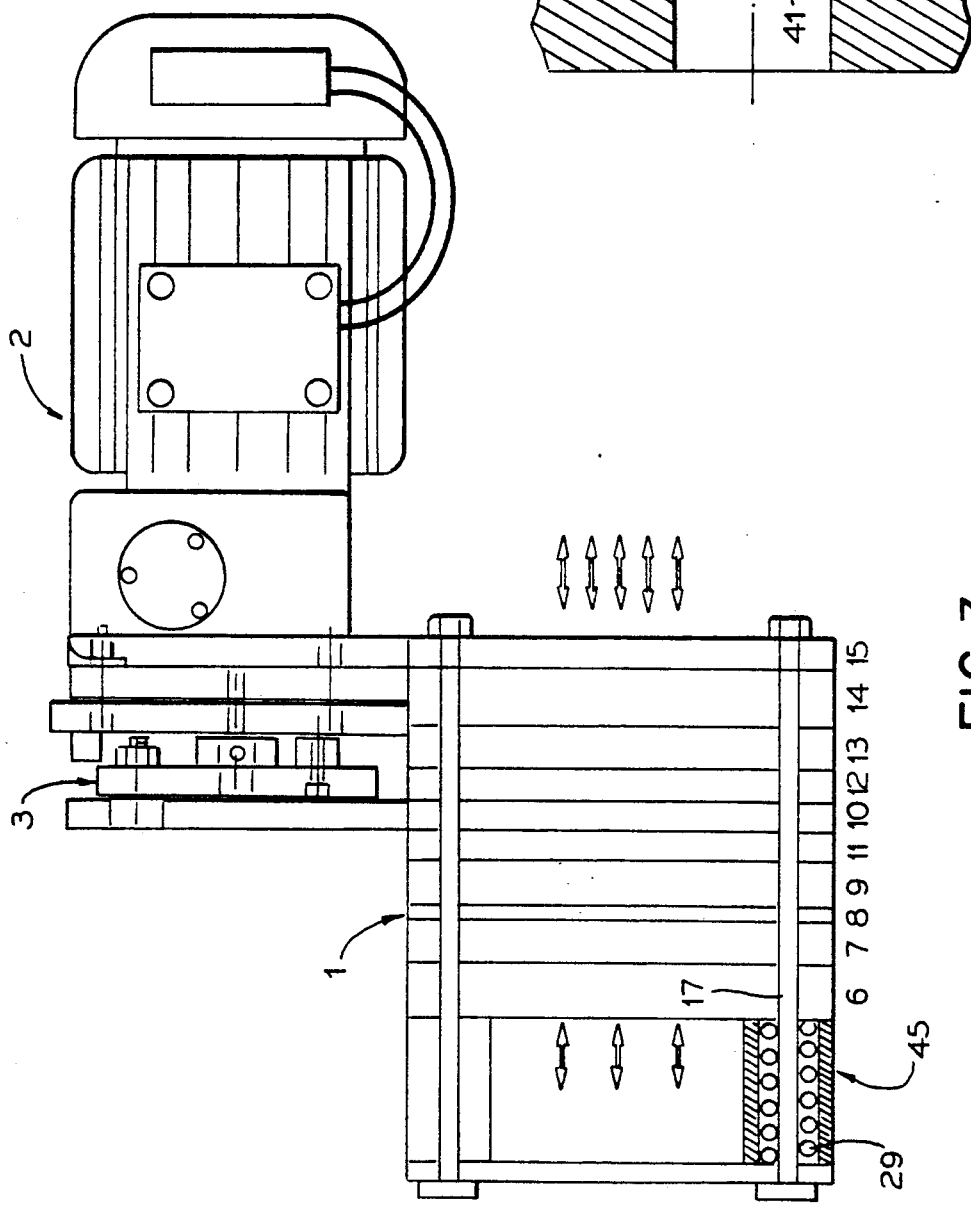
FIG. 3 shows a schematic diagram of the main valve.

In order to achieve a proper valve seal during operation, while simultaneously ensuring that minimum force is required to shift the position of the control plate (10) and avoiding wear on the sealing rings (41) or gasket (43), the plate assembly is held together by a clamping arrangement (45) which makes it possible to apply a predetermined pressure to hold the plates together. In FIG. 3, which shows a schematic depiction of the plate assembly, this clamping arrangement is shown in greater detail. The plate assembly is held together by plates 6 and 15 by means of screws (17) on which the plates are mounted in a manner allowing them to be shifted. The springs (29) provide a constant predetermined pressure, ensuring a seal of the valve as a whole and between the individual channels within the valve.

The main valve (1) is constructed from appropriately perforated plates of low-density polyethylene, which are very simple and cheap to produce. The control plate (10) is shifted into its three positions by a motor drive (2) operating through an eccentric mechanism (3) (FIG. 3).

This drive is connected to a central control mechanism which allows fully automatic operation of the entire system.

The two-stage backwashing procedure described above is activated when clogging of filter unit A has progressed to the point of causing a pressure buildup in the intake chamber of that unit. At that point, a pressure switch installed in the chamber activates the cleaning program already explained above. The central control mechanism activates the drive controlling the control plate (10) and valves V1 and 3, as well as the corresponding pumps, in a programmed sequence, such that during adjustment of the control plate (10), the filter pump (FP) and the backwash pump (RP) are switched off.

The main valve described above has the advantage of having only three defined selectable positions. This avoids the possibility of liquid being misrouted because of a failure of an individual valve. The control function is also substantially simplified by this arrangement. The number and length of connecting hoses can be reduced considerably. In the working position, dielectric flows straight through the valve without detours, thereby preventing fouling.

Figure 2:
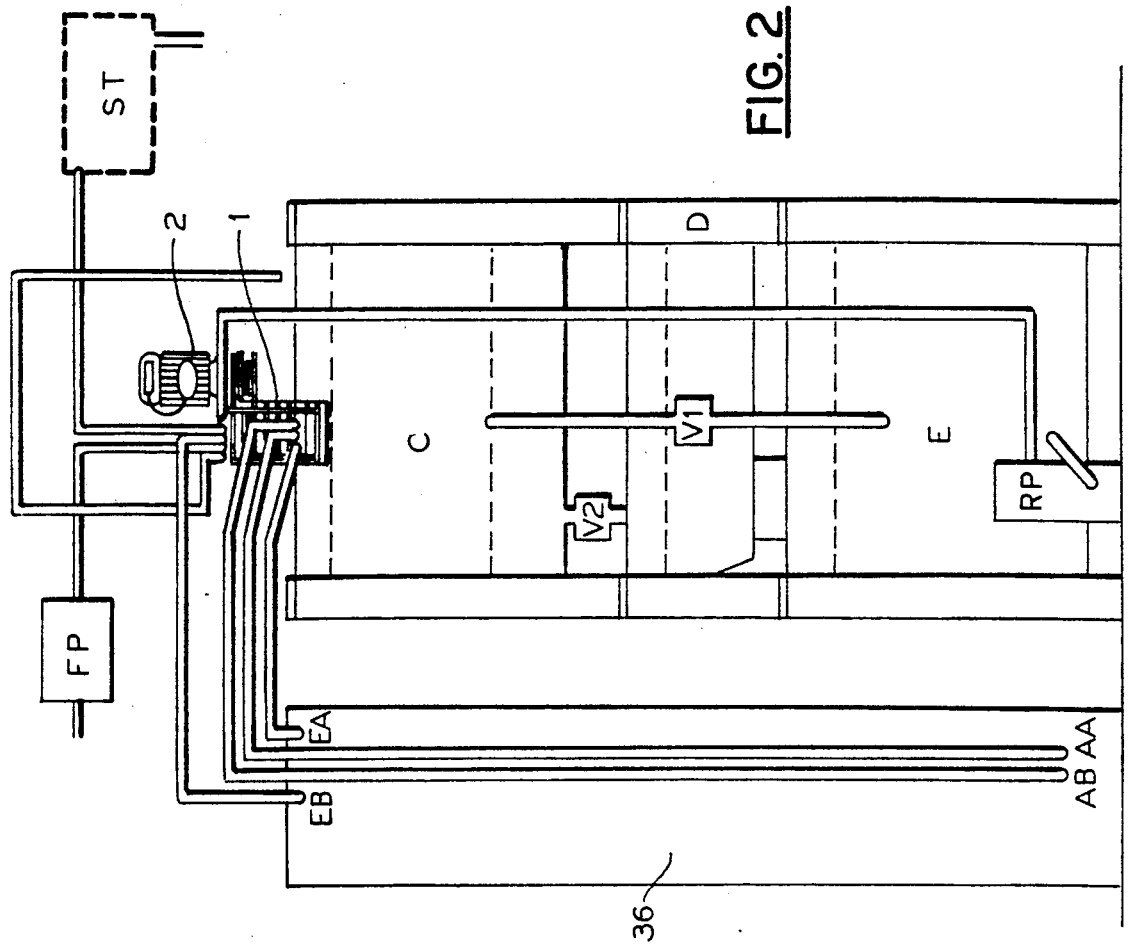
FIG. 2 shows a schematic diagram of the entire filtration system, with two/filter units, main valve and sedimentation unit for the backwashing liquid.

The aforementioned periodic backwashing transfers the metal particles, together with the backwashing liquid, to the sedimentation tank (C) (cf. FIGS. 2 and 6). These particles will have joined together in the labyrinth filter to form conglomerates, which are deposited relatively quickly in the sedimentation tank. This is not the case with metal particles coming directly from the spark erosion machinery, which form suspensions that refuse to settle even after extremely prolonged periods. Thus the labyrinth filter constructed in accordance with the invention has the effect of joining the metal particles together to form stable conglomerates, which collect on the bottom of the sedimentation tank within a relatively short period. As already mentioned, the cleared backwashing liquid remaining on top of this sediment can be returned to the backwash tank (E) to be available for the next backwashing operation. Thus the backwash circuit likewise comprises a closed circulation, from which the metal particles removed by erosion and subsequently conglomerated are eliminated in the sedimentation tank (C) and in the drying tank (D). In the drying tank (D), the bottom deposit from the sedimentation tank is deposited onto a filter matting, through which the remaining liquid can likewise flow back to the backwash tank. The erosion residue dries into the form of a brick on the filter matting, and can then be recycled as scrap metal.

Finally, FIG. 2 shows the system described above in a compact design suitable for industrial applications. A number of spark erosion machines can be connected to the system, with the filter pump (FP) feeding the contaminated dielectric from the erosion receptacles to the filtration system, and from there to a clean tank (ST) (depicted schematically), whence the clean dielectric is returned to the erosion receptacles.

I claim:

1. A labyrinth filter to remove small spherical metal particles from a dielectric used in spark erosion equipment comprising:
   a liquid tight receptacle, said receptacle having an inlet and an outlet;
   first and second grain barrier means disposed within said receptacle near said receptacle inlet and said receptacle outlet respectively for preventing filter grains from leaving said receptacle while permitting dielectric flow in either direction within and through said receptacle;
   filter grains of non-uniform size and shape loosely disposed within said receptacle between said first and second grain barrier means filling a portion of said receptacle forming a filter grain column within said receptacle, the upper surface of said grain column providing an intake surface, and an outlet surface supported on said second grain barrier;
   filter pump means attached to the inlet of said receptacle for generating a flow of dielectric through said filter grain column which creates low pressure zones behind the filter grains for trapping the metal particles, said grain column intake surface diameter, said grain column effective height between the intake surface and the outlet surface, and said pump means being matched to one another to ensure that the dielectric flow through the filter exceeds 2 meters per minute.

2. A labyrinth filter as in claim 1 wherein the receptacle and grain column therein are substantially circular in cross section, the circular cross sectional diameter of said column being sized to measure less than 1/6th the grain column length reaching from the inlet surface of the grain column to the outlet suface of the grain column.

3. A labyrinth filter as in claim 1, wherein the grain column diameter measures approximately 1/12th the total flow height from the upper surface of the grain column to the lower surface of the grain column.

4. A labyrinth filter as in claim 1 wherein the rate of flow of the dielectric is approximately 11 meters per minute.

5. A labyrinth filter as in claim 1 wherein the filter grains are quartz sand measuring between 0.3 mm and 0.7 mm in diameter.

6. A labyrinth filter as in claim 1, wherein said first and second grain barrier means include coil spring elements having coil element spacing sized to permit dielectric flow between the adjacent coil elements while preventing grains from passing therebetween.

7. A closed circuit, continuously operable filtration system including a backwash filter to remove small spherical metal particles from a dielectric used in spark erosion equipment comprising:
   at least two labyrinth filters, each of said filters having an inlet end and an outlet end for receiving and discharging said dielectric and a filter grain flow column, each of said labyrinth filters having a circular cross section and an effective height between an upper intake surface and a lower outlet surface wherein said intake surface diameter and said grain column effective height is sized so that the diameter is less than 1/6th the grain column height;
   a dielectric pumping means;
   main control valve connecting fluid communication to each of said filters and said pump means;
   a sediment tank connected to said control valve, said sediment tank including a dry tank portion in the bottom for receiving metal particles that settle out from the backwash dielectric in the sediment tank;
   clean tank for receiving filtered dielectric;
   backflush tank coupled in fluid communication with said sediment tank and said control valve;
   said control valve having first, second and third operating positions whereby in said first operating position said first and second filters are connected in series, the output of which leads to the clean tank containing filtered dielectric, and in said second operating position said first filter is connected to the clean tank to permit continuous filtering operation while said second filter is being backflushed while connected to said backflush tank and in said third operating position which connects said second filter to said clean tank and said first filter between said backflush tank and said sedimentary tank, and means for controlling said control valve connected to said control valve.

8. A labyrinth filter filtration system as in claim 7 in which said control valve includes a control plate and a plurality of perforated plates stacked adjacent said control plate, said control plate being movable parallel to said stacked plates among at least three different positions such that in the first position both of said labyrinth filters are connected in series to said control valve. and in the second position one of said filters is connected to the backwashing circuit and one to the normal operating circuit, and a third position where the second filter is connected to the backwash system and the first filter connected to the normal operating circuit.

9. A labyrinth filter combination with a backwash system in accordance with claim 8 including:
   at least one depositation tank and one backwash tank connected to the depositation tank containing liquid used for backwashing.

10. A process for removing small spherical metal particles ranging in size from 1 to 20 from the dielectric used in spark erosion systems with a labyrinth filter having a watertight tubular receptacle and a granular filter bed disposed therein, said granular filter disposed in a column having a diameter 1/6th in size of the column height, said receptacle having an inlet and an outlet, comprising the steps of:

(1) pumping dielectric fluid containing small spherical metal particles into the inlet of said filter; and (2) establishing a flow rate greater than 2 meters per minute through said receptacle and granular filter bed creating pockets of low pressure behind grains trapping metal spheres throughout the filter bed.

11. The process as in claim 10 which includes filter backwashing including the step of creating at least one high pressure pulse flow of the dielectric from the outlet end to the inlet end of said filter.

* * * * *